United States Patent

De Jong

[11] 4,333,871
[45] Jun. 8, 1982

[54] COAGULATION METHOD FOR PREPARING LEAF PROTEIN CONCENTRATES (LPC) FROM PLANT FOLIAGE

[75] Inventor: Donald W. De Jong, Youngsville, N.C.

[73] Assignee: International Harvester Company, Chicago, Ill.

[21] Appl. No.: 244,843

[22] Filed: Mar. 18, 1981

[51] Int. Cl.³ ............................................... A23J 1/14
[52] U.S. Cl. ..................................... 260/112 R; 426/2; 426/630; 426/635; 426/656; 426/807
[58] Field of Search ................................... 260/112 R

[56] References Cited

U.S. PATENT DOCUMENTS

| | | | |
|---|---|---|---|
| 3,294,564 | 12/1966 | Karjala et al. | 260/112 B X |
| 3,507,662 | 4/1970 | Leroy et al. | 426/807 |
| 3,823,128 | 7/1974 | Bickoff et al. | 260/112 R |
| 3,823,129 | 7/1974 | Kalb et al. | 260/123.5 |
| 3,959,246 | 5/1976 | Bickoff et al. | 260/112 R |
| 4,066,633 | 1/1978 | Gastineau et al. | 260/112 R |
| 4,116,771 | 9/1978 | Amotz et al. | 435/177 |
| 4,130,553 | 12/1978 | Batley, Jr. et al. | 260/112 R |
| 4,211,795 | 7/1980 | Leroy et al. | 426/2 |

OTHER PUBLICATIONS

Science, vol. 155, Mar. 1967, De Jong, pp. 1672–1674.
Archives of Biochemistry & Biophysics, vol. 129, No. 1, Jan. 1969, pp. 221–227, Jansen et al.

*Primary Examiner*—Howard E. Schain
*Attorney, Agent, or Firm*—John P. O'Brien; F. David AuBuchon

[57] ABSTRACT

The addition of a multifunctional crosslinking reagent, such as glutaraldehyde, to green juice in conjunction with lowering the pH to a value in the range of 3.0 to 5.0, such as by the addition of potassium bisulfate causes substantially complete precipitation of soluble proteins from green juice extracted from leafy plant tissue and simultaneously coagulates suspended protein. The multifunctional crosslinking reagent generally can be any compound having a chemical structure within the following general formula:

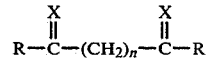

wherein X is a divalent ion such as oxygen, sulfur or NH; R is hydrogen or a short chain alkyl radical having 1–5 carbon atoms; and n is an integer in the range of 0–10.

11 Claims, 1 Drawing Figure

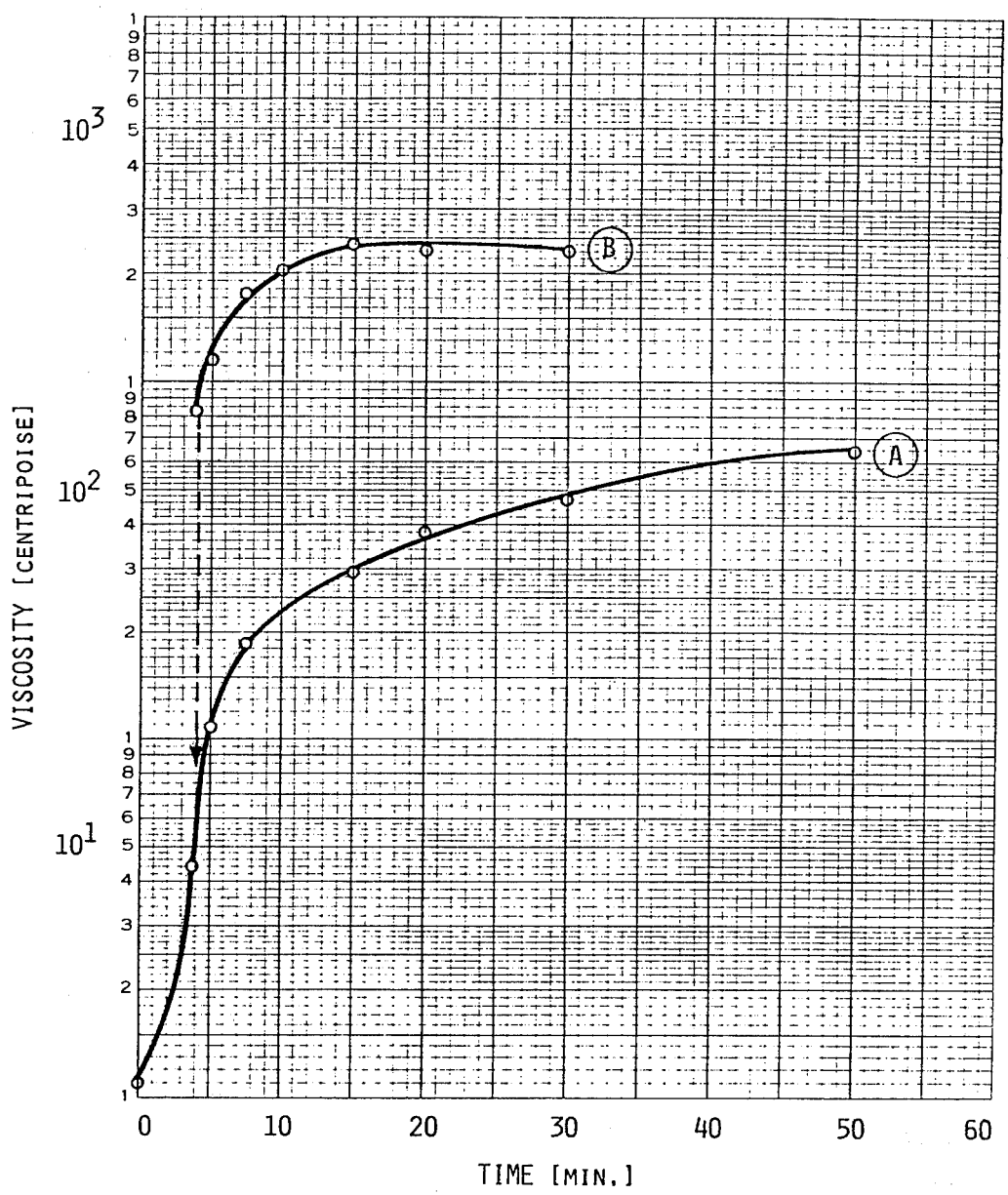

COAGULATION METHOD FOR PREPARING LEAF PROTEIN CONCENTRATES (LPC) FROM PLANT FOLIAGE

BACKGROUND OF THE INVENTION

1. Field of the Invention

The present invention relates to a method of separating a protein concentrate from foliage of leafy green plants. These concentrates generally are referred to as leaf protein concentrates or LPC. More particularly, the present invention relates to a method of precipitating soluble protein fractions and simultaneously coagulating suspended protein fractions from green juice expressed from macerated leaf tissue, without the requirement for high temperature treatments, i.e., steam, or for the utilization of dangerous or costly chemical precipitants.

2. Description of the Prior Art

The desirability of separating protein from a very inexpensive protein source, such as forage crops, has been recognized for many years. Laboratory efforts directed toward this end have been carried on since at least 1940 for the purpose of finding a commercially viable method of extracting plant protein as a nutritional supplement for humans, and as an animal feed. The removal of a substantial portion of the protein from tobacco has been examined for the purpose of producing a more pleasant smelling tobacco smoke and a safer product with the additional benefit of providing a useful protein by-product for human consumption, as set forth in the article, "Recent Advances In Chemical Composition in Tobacco and Tobacco Smoke", by DeJong et al, Proceedings of American Chemical Society Symposium, 1977.

Proteins have been precipitated from solution, particularly in the laboratory, by many techniques. Soluble protein has been precipitated by adding precipitants to solution, for example, the addition of polar solvents, mineral salts and polyelectrolytes. One common technique for precipitating protein from solution is by adjusting the pH of the protein solution to the protein isoelectric point with the addition of an organic or mineral acid. Isoelectric precipitation of soluble protein has been made commercial, but it has been found that the protein precipitate is very difficult to remove from the solution since the precipitate has a very fragile particulate structure and therefore it is difficult to coagulate and sediment.

Another very common method of precipitating and coagulating soluble protein from solution is by heating the protein solution, the heat being supplied usually in the form of steam. A substantial amount of energy is required to perform the heat precipitation method and very serious problems can result from the heat precipitation technique. The heat precipitated protein product can suffer irreversible damage in heating, thereby lowering the nutritional value of the product. Further, the heat precipitation technique, although commercially feasible, is associated with processing problems because high temperature protein precipitation produces a protein product which is very adhesive in nature so that the protein product continually fouls interior surfaces of pumps, hoses, tanks and other transport and storage apparatus.

Glutaraldehyde has been reacted with protein to form water-insoluble, enzymatically active products for specialized use in column or filtration techniques, to remove or alter substances (see Jansen and Olson, Archives of Biochemistry and Biophysics, volume 129, No. 1, January, 1969, pages 221–227), and for fixation of the protein for study (see Science, Mar. 31, 1967, Vol. 155, No. 3770, pages 1672–1674).

One of the problems experienced during the reaction of glutaraldehyde with protein is that the reaction proceeds very slowly, particularly at low pH levels. As set forth by Jansen and Olson (Table 1, page 223, Archives of Biochemistry and Biophysics), a time period of about 24 hours is required for the occurrence of the first visual precipitate when protein containing $\epsilon$-amino groups (i.e., papain) is reacted with glutaraldehyde at a pH of about 5.0 or lower.

The Leroy et al. U.S. Pat. Nos. 4,211,795 and 3,507,662 disclose a process for reacting an animal feed with a tanning substance (i.e., glutaraldehyde) to form a more insoluble feed to substantially decrease the deaminization of proteins in the ruminant of animals. The Leroy et al. patents, however, do not teach or suggest the reaction of glutaraldehyde with protein in solution for the purpose of precipitation and, particularly, do not teach the use of glutaraldehyde for precipitation of proteins from green juice. Further, because of the condition of the animal feed, when reacted, a substantial amount of contact time is required to permit the feed to absorb the glutaraldehyde for reaction.

The Kalb et al. U.S. Pat. No. 3,823,129 discloses a process of reacting a particular protein (Concanavalin A—a protein contained in Jack beans) with glutaraldehyde to insolubilize the protein so that the insolubilized protein can be repeatedly used for the recovery of transition metals and saccharides.

The Batley et al. U.S. Pat. No. 4,130,553 discloses a method of precipitating protein from green juice by raising the pH to a level of at least 9.0 and discloses, in the background of the invention, a common prior art heat precipitation technique wherein the green juice is heated to a temperature of at least 70° C. and the pH of the juice is adjusted to a value below 5.0.

The Bickoff et al. patent 3,823,128 discloses a method of precipitating protein from green juice by adding a source of sulfite ions, such as sodium sulfite or bisulfite or potassium sulfite or bisulfite. In accordance with the Bickoff et al. invention, the precipitated material has a jelly-like consistency and is heated to a temperature of 70°–90° C. to change the jelly-like material into a curd material, at an alkaline pH, so that the precipitate can be removed.

The Amotz et al. U.S. Pat. No. 4,116,771 discloses a method of insolubilizing enzymes by a crosslinking reaction with glutaraldehyde so that the resulting enzyme product may be used in such environments as an enzyme reactor and the like.

Two published government owned patent applications Ser. No. 897,083 filed Apr. 17, 1978 and Ser. No. 15,491, filed Feb. 26, 1979 disclose, similar to the above described Leroy et al. U.S. Pat. Nos. 4,211,795 and 3,507,662, contacting an animal feed with a particular reactant to protect the animal feed from ruminal degradation. Neither of these published government applications suggest that glutaraldehyde can react with protein at a particularly low pH to cause easy and fast precipitation of protein from green juice resulting in a curd coagulant easily removable from processing equipment.

Other uses for glutaraldehyde have been disclosed such as in U.S. Pat. No. 2,941,859 (leather tanning); U.S.

Pat. No. 3,342,543 (wool stabilization); and U.S. Pat. No. 3,294,564 (protein alteration). Prior to the present invention, however, the crosslinking reagents disclosed herein have not been used to precipitate and coagulate protein from green juice at a pH in the range of 3.0–5.0. The glutaraldehyde reaction carried out in leather tanning and wool stabilization proceeds over a wide range of pH, although an alkaline pH generally is preferred. The crosslinking reaction of the present invention is a substantially different reaction than the glutaraldehyde reaction in wool stabilization or leather tanning as evidenced by the fact that the reaction disclosed herein cannot be carried out at an alkaline pH.

In accordance with an important feature of the present invention, the protein curd separated from green juice has little to no phenolic compounds covalently bound to the separated protein. Apparently, this phenomenon results from the fact that the $\epsilon$-amino groups of the lysines of the protein separated in accordance with the present invention are tied to one another by virtue of the crosslinking reagent as defined herein, rather than being free as a reaction site for polyphenols or other deleterious reactants. It is well known that polyphenols often cause nutritional difficiencies and toxicities when proteins containing substantial amounts of polyphenols are used for animal feeds, as shown for protein extracted from high-tannin species of sorghum (see Whitaker et al. Chemical Deteri-oration of Proteins, ACS Symposium Series 123, 1980 Chapter 9 pages 202–206 and Chapter 1, pages 1–14). Because amino groups are excellent and because there are invariably many epsilon amino groups of lysines on the surface of proteins, it is an important feature of the present invention that the separated protein has substantially all of the lysine amino groups tied together, in the same or adjacent molecules, so that they are not available as reaction sites. Accordingly, the protein separated in the manner prescribed by the present invention is not subject to the common deteriorative reactions involving lysine.

SUMMARY OF THE INVENTION

I have discovered that the addition of a multifunctional crosslinking reagent to green juice in conjunction with lowering the pH to a value in the range of 3.0 to 5.0 causes substantially complete precipitation of soluble proteins from green juice extracted from leafy plant tissue and simultaneously coagulates suspended protein in an unexpectedly short time period.

Accordingly, an object of the present invention is to provide a new and improved method of precipitating and coagulating protein from green juice expressed from plant foliage.

Another object of the present invention is to provide a new and improved method of preparing a leaf protein concentrate from plant foliage in a commercially viable short period of time.

Another object of the present invention is to provide a new and improved method of separating substantially all of the protein contained in a green juice by causing simultaneous protein precipitation and coagulation.

Another object of the present invention is to provide a new and improved protein coagulum, derived from green juice, having improved rumen-by-pass qualities as a dietary substance for animals.

Another object of the present invention is to provide a new and improved method of precipitating soluble protein and coagulating suspended protein from green juice wherein the resulting coagulum tenaciously binds internally to form physically desirable curds easily removed from process equipment.

Another object of the present invention is to provide a new and improved method of precipitating and coagulating protein from green juice wherein the resulting coagulum is unexpectedly easy to separate from the liquid phase in which it is coagulated.

Another object of the present invention is to provide a new and improved method of precipitating and coagulating protein in and from green juice in a manner such that the resulting coagulated curd precipitates easily and can be separated from the remaining brown juice by conventional separating techniques such as decantation, filtration or centrifugation.

Another object of the present invention is to provide a new and improved coagulated protein precipitate and method of separating the coagulant from green juice wherein the protein coagulum has little or no bound phenolic compounds.

Another object of the present invention is to provide a new and improved process for separating protein from green juice in such a manner that the remaining brown juice contains nutritional value as a fertilizer, for example in the form of potassium and/or sulfate.

DETAILED DESCRIPTION OF THE PREFERRED EMBODIMENT

In the preliminary steps of the invention, the leafy green material is harvested preferably at a prime stage of growth for optimum protein concentration. After physical maceration to cause substantial cell disruption, the leaf slurry is subjected to mechanical pressure to free green juice from the fibrous residue, as well known in the art.

In accordance with the known art of macerating leafy green material to separate green juice, the resulting juice generally includes a host of various dissolved protein molecules and suspended protein. Most of the suspended protein is in the form of green chlorophyll-protein complexes. Generally, the seives used in separating the green juice from the fibrous green plant matter are relatively coarse, on the order of 20 to 25 microns so that the suspended protein complexes comprise about 5% by weight of the green juice. For the purpose of the present invention, there is nothing critical in the method or apparatus used to separate the green juice from the green leafy material and any desired amount of suspended protein can be coagulated and separated together with precipitation of the dissolved protein.

During maceration it may at times be advisable to add an anti-oxidant chemical such as a thiol or bisulfite compound to suppress oxidative reactions which result in irreversible damage to the protein. Antioxidant addition is not an essential or necessary part of the present invention, but use of an anti-oxidant may be advisable depending upon the amount of protein oxygenation occurring due to exposure to air; the type of plant harvested, particularly if the plant parts, e.g., leaves of sunflower, contain a relatively large amount of phenolics; and the stage of growth encountered.

Precautions should also be taken during maceration and pressing to avoid a drop in pH below pH 5.8. If the pH drops below this level before a green juice is obtained, an upward adjustment of pH with alkali may be necessary to prevent premature protein precipitation. The physical aspects of the preliminary steps in obtaining a green juice, however, are not critical and green juices have been obtained for laboratory study for many years. The invention described herein is applicable to any photosynthetic organism or green plant matter from source plants as widely divergent as plantation trees, annual and perennial legumes, grasses, other fodder plants such as brassicas, amaranths, cenopodias, solanacias, and comfrey as well as the above-ground portion of plants normally grown for their edible root organs.

In accordance with the principles of the present invention, the soluble protein crosslinks with the suspended protein causing total removal of substantially all soluble and suspended protein by the addition of a particular coagulant to green juice and pH lowering to a value in the range of 3.0 to 5.0. It is quite unexpected that the dissolved protein in green juice solution and the protein suspended in the green juice will simultaneously, and substantially completely coagulate by addition of the crosslinking agent followed by pH adjustment to a value in the range of 3.0 to 5.0. Quite surprisingly, the resulting protein coagulum obtained from green juice is readily sedimented by minimal gravity forces, such as by centrifugation, and exhibits a high degree of internal cohesion. It is quite unexpected that the coagulum tenaciously adheres to itself to provide a coagulum in naturally obtained, relatively large curds, and the coagulum at the same time shows little tendency to adhere to container surfaces substantially eliminating the problem of fouling generally encountered in the handling of precipitated proteins. This coagulum adherence problem heretofore has essentially prevented substantial commercial exploitation of protein separation from green juice.

In accordance with one embodiment of the present invention, the multifunctional crosslinking reagent can be any compound having a chemical structure within the following general formula:

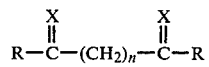

wherein X is a divalent ion such as oxygen, sulfur or NH; R is hydrogen or a short chain alkyl radical having 1-5 carbon atoms; and n is an integer in the range of 0-10. When X is oxygen and R is hydrogen the crosslinking reagent is a bifunctional aldehyde such as glyoxal, glyceraldehyde, malonaldehyde, succinaldehyde, and glutaraldehyde. Other examples of useful crosslinking reagents within the above general formula include 3-ketobutylaldehyde ($CH_3-COCH_2CHO$) and the three isomers of hexanedione. Suitable polymers having repeating units within the above general formula are also useful in accordance with the present invention, such as dialdehyde starch.

In accordance with another important embodiment of the present invention, the crosslinking reagent can be any compound having a chemical structure falling within the following general formula:

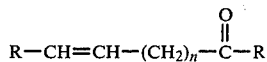

wherein R is hydrogen or a short chain alkyl radical having 1-5 carbon atoms; and n is an integer from 0-9. Suitable polymers having repeating units falling within the above general formula are also useful as the crosslinking reagent in accordance with the present invention. An example of a suitable crosslinking reagent within this general formula is crotenaldehyde ($CH_3CH=CHCHO$).

In accordance with an important feature of the present invention, the crosslinking reagent is added to the green juice prior to the addition of the acidic, pH lowering reagent to assure a proper final pH in the range of 3.0 to 5.0.

The crosslinking reagent is added to the green juice in an amount of at least 0.5% based on the volume of the green juice extracted from the plant material. Generally, at least 0.1% by volume crosslinking reagent is sufficient to crosslink or tie up substantially all of the adjacent $\epsilon$-amino groups in the protein molecules so that generally they are no longer available as reaction sites. It is preferred to add the crosslinking reagent to the green juice in an amount of about 0.1% to about 1% by volume of the extracted green juice. Addition of the crosslinking reagent in amounts greater than about 2% by volume generally causes waste of crosslinking reagent because of the stoichiometric quantity of reactive amino groups in the soluble and suspended protein molecules contained in the green juice extracted from green plant material.

The addition of a crosslinking reagent of the present invention to green juice causes an immediate downward shift in pH, indiciative of neutralization of positive charges in the green juice. Crosslinking of the amino ($-NH_2$) residues on the protein chains appear to contribute most to this effect. Because of this pH lowering, the amount of additional acid required to lower the pH sufficiently to enhance coagulation of the crosslinked protein molecules is sharply reduced. The crosslinking reagent is added in an amount of 0.1 to 2% based on the volume of green juice expelled from the green leaves.

An acid pH lowering reagent is added to the green juice, containing the crosslinking reagent, immediately after thoroughly mixing the crosslinking reagent into the green juice to obtain a final pH in the range of 3.0 to 5.0. Adjustment of pH downward from the pH of the green juice containing the crosslinking reagent is accomplished quite easily by titration with any suitable acid, such as formic, acetic, propionic, hydrochloric, or sulfuric or alternatively with an acid salt including potassium bisulfate, sodium bisulfite and the like. The use of an acid salt solution rather than acid is highly recommended because it is easier and safer to handle and is less corrosive.

It is quite unexpected that soluble and suspended protein extracted from green juice will precipitate and coagulate substantially immediately after the addition of the crosslinking reagent of the present invention when the pH is lowered to a value in the range of 3.0 to 5.0. As explained in the background of the invention, proteins derived from other sources have required approximately 1 hour to form the first visual precipitate when reacted with glutaraldehyde at a pH below about 5. In accordance with an important advantage of the present invention, after the addition of the crosslinking reagent, as soon as the pH is lowered within the range of 3.0 to 5.0, simultaneous precipitation and coagulation of protein from green juice occur immediately. Accordingly, the process of the present invention is commercially feasible on a continuous basis.

A new and unexpected benefit obtained in accordance with the crosslinking reaction of the present invention, in contrast to the above described heat or acid prior art precipitation methods, is that the protein precipitated and crosslinked in accordance with the present invention has its reactive sites protected from deleterious bonding with phenolic substances, resulting in a protein coagulum which is much better in quality than prior art coagulums. One of the primary problems in extant LPC technology is that the protein precipitates are frequently highly contaminated by other naturally occurring substances in the green juice. Some of the non-protein substances are chemically bound and thereby difficult to remove by clean-up techniques. In particular, the presence of phenolics and their oxidized derivatives have been a troublesome source of poor LPC quality. The crosslinking reaction of the present invention at a pH of 3.0 to 5.0 causes internal bridging of adjacent protein chains and in so doing protects reactive sites from chemically bonding with phenolic substances. As a result, I have found, most unexpectedly, that most of the occluded phenolic fraction contained in green juice can be physically removed from the protein coagulum by a single wash step in dilute acid.

In accordance with another important feature of the present invention, the protein coagulated in accordance with the present invention is ideal as an animal feed because of the ability of the coagulum to by-pass an animal's rumen. Rumen-by-pass capability has come to be recognized as an important feature in protein feed supplements for cattle, sheep and other ruminants because the by-pass phenomenon means that less protein is degraded in the animal rumen and more protein is made available for subsequent digestion in the animal's true stomach or abomasum. The coagulum separated in accordance with the present invention is exceptionally good animal feed because of its purity. The coagulum contains little or no bound phenolic and is easily washed free of impurities in the green juice from which it was separated.

Since the crosslinking reaction of the present invention is essentially instantaneous, the mechanical aspects of liquid/solid separation can proceed at once. Such separation can be achieved by conventional filtration or centrifugation devices so as to squeeze excess liquid from the coagulum. The resultant wet protein coagulum is found to contain about 50–75% moisture depending upon the efficiency of the liquid-solid separation device. The protein then can be washed, for example in dilute acid, and re-pressed before being dried or placed in wet storage.

EXAMPLES

The invention is further clarified by the following illustrative examples:

EXAMPLE I

Alfalfa leaves were macerated and pressed to obtain a free flowing green juice having approximately 10% solids. Portions of the green juice were contacted successively with a crosslinking reagent, glutaraldehyde, and an acidulant, potassium bisulfate (saturated solution, approx. 28% w/w). Table 1 demonstrates the effect of adding varying levels of glutaraldehyde and potassium bisulfate solution to obtain different concentrations of crosslinking reagent and a range of pH's in the green juice. Samples were subsequently centrifuged and the residual nitrogen in the brown juice estimated by the Kjeldahl assay for organic nitrogen. Because the nitrogen in the brown juice is not entirely proteinaceous, the values are given as percent nitrogen. It can be observed that a ⅔ reduction of residual nitrogen in the brown juice is achieved by the crosslinking reaction. Brown juice samples with the lowermost values were essentially freed of true protein because no precipitate formed as a result of heating the brown juice to 80° C.

Furthermore, no acid insoluble nitrogen was found in the same samples.

TABLE 1

EFFECT OF CROSSLINKING REAGENT CONCENTRATION AND pH ADJUSTMENT ON PROTEIN REMOVAL FROM GREEN JUICE EXTRACTED FROM ALFALFA LEAVES*

| GLUTAR-ALDEHYDE CONCENTRATION (%) | pH ADJUSTMENT WITH KHSO$_4$ | RESIDUAL NITROGEN IN BROWN JUICE (%) |
|---|---|---|
| 0.05 | 4.5 | 0.151 |
| 0.10 | 4.5 | 0.129 |
| 0.50 | 4.5 | 0.106 |
| 1.00 | 4.5 | 0.101 |
| 0.50 | 5.5 | 0.207 |
| 0.50 | 5.0 | 0.110 |
| 0.50 | 4.5 | 0.106 |
| 0.50 | 4.0 | 0.106 |
| 0.50 | 3.5 | 0.090 |

*Nitrogen percent in starting green juice was 0.314.

EXAMPLE II

This experiment compares protein coagulum, recovered by the crosslinking reaction of the present invention, with heat and isoelectric precipitates obtained from identical green juice. As demonstrated in Table 2, the crude protein content as determined by Kjeldahl assay in the coagulum formed by the present invention was higher than in the heat precipitate but not as high as in the isoelectric precipitate. The differences are due in part to the amount of water retained in the coagulum after centrifugation but are also due to the degree of contamination of the isoelectric precipitate with non-nitrogenous substances and the degree of fineness of the isoelectric precipitate-making the isoelectric precipitate extremely difficult to separate by standard techniques, such as centrifugation. The UDY values are indicative of the number of free lysine groups available for binding to the dye. It is noteworthy that for a given concentration of protein, the crosslinked coagulum bound approximately one-half the amount of dye bound by the heat coagulum.

The significance of this result is that the lysine groups in crosslinked coagulums separated in accordance with the present invention are protected to a greater extent than heat coagulums from binding reactive juice constituents such as phenolics, quinones and reducing sugars. Consequently, severe contamination of the LPC by these substances is prevented, thereby improving the nutrient quality of the protein. Further, the amount of isoelectric precipitate is an indication of the fine particle size, compared to the internally cohesive coagulum of the present invention which is easily separated in large, well defined curds.

TABLE 2
COMPARISON OF COAGULATION METHODS ON PROTEIN CONTENT OF WET COAGULUM OBTAINED FROM ALFALFA LEAVES

| TREATMENTS | KJELDAHL VALUES Crude protein in wet green coagulum (%) | UDY VALUES Protein concentration required to bind 50% of orange G dye (%) |
|---|---|---|
| Heat treatment: 80° C. 10 min | 6.58 | 7.66 |
| Isoelectric precipitation: Acidification to pH 3.5 | 12.20 | 12.07 |
| Crosslinking precipitation: Glutaraldehyde (0.5%) followed by pH adjustment to 4.5 with KHSO$_4$ | 9.6 | 13.40 |

EXAMPLE III

This example illustrates the effectiveness of the crosslinking reaction of the present invention in coagulating all the true protein from green juice. As Table 3 demonstrates, a dialysis experiment with brown juice deproteinized by the crosslinking reaction of the present invention proved conclusively that the Kjeldahl value in the brown juice is due entirely to non-protein nitrogen. The experiment was conducted by macerating comparable alfalfa samples, one in the presence of 0.2% sodium metabisulfite and the other without the sodium metabisulfite anti-oxidant. After crosslinking the protein and centrifuging the coagulum, 20 ml portions of the two brown juice supernatants were dialyzed with Sepraphor #2 tubing in deionized water adjusted to pH 7.0 with KOH. Three changes of water were made after one hour intervals after which the containers were placed in a refrigerator and exhaustively dialyzed overnight in fresh pH 7.0 deionized water. As shown, virtually all the Kjeldahl nitrogen in both samples was dialyzable, indicating that it was non-protein nitrogen. It is concluded that the crosslinking reaction in accordance with the present invention is capable of coagulating all the protein from solution and providing a superior LPC for animal feeding purposes.

TABLE 3
TRUE PROTEIN CONTENT OF BROWN JUICE RESULTING FROM REMOVAL OF PROTEIN BY CROSSLINKING REACTION

| TREATMENTS | | KJELDAHL VALUE Nitrogen content in brown juice (%) |
|---|---|---|
| Extracted with 0.2% | Undialyzed | 0.073 |
| Sodium metabisulfite | Dialyzed | 0.005 |
| Extracted w/o | Undialyzed | 0.084 |
| Sodium metabisulfite | Dialyzed | 0.005* |

*Below detection level

EXAMPLE IV

The precipitates of Example II were immersed in 5% propionic acid, known for being able to extract brownly colored phenolic compounds from protein coagulums. The coagulum separated in accordance with the present invention, when immersed in propionic acid, immediately began to exude brownly colored phenolic substances into the propionic acid, causing the suspending medium to darken appreciably indicating that the phenolics from the green juice were not chemically bound to the coagulum and could easily be extracted. The heat precipitates, however, did not exude any brownly colored substances in propionic acid, even when immersed over a period of six months—indicating that the phenolics were chemically bound to the precipitates and could not be extracted.

As the crosslinking reaction of the present invention proceeds, the viscosity of the green juice substantially and immediately increases because of the chemical bonding or crosslinking between the ε-amino groups of lysine subunits on the same or adjacent protein molecules. The viscosity increase occurs immediately after the crosslinking reagent is thoroughly mixed into the green juice and when the pH is lowered in the range of 3.0 to 5.0. Some of the protein coagulum can be separated immediately after pH adjustment while the remainder of the green juice continues to react with the crosslinking reagent.

EXAMPLE V

Glutaraldehyde was added to identical green juice samples A and B in the same amounts of 0.5% by volume of the green juice. The pH of both samples after glutaraldehyde addition and thorough mixing was pH 5.25. Sample A was permitted to react with the green juice without pH lowering. KHSO$_4$ was added to Sample B to a pH of 4.5. As shown in the drawing, Sample B reached a maximum viscosity in less than 5 minutes, whereas sample A did not reach maximum viscosity in 50 minutes. Further, Sample B reached a viscosity of about 2400 centipoises in about 10 minutes, as shown in the drawing, whereas Sample A had only reached a viscosity of about 650 centipoises in 50 minutes indicating that surprisingly, more crosslinking occurred when the pH was adjusted to a value in the range of 3.0 to 5.0.

I claim:

1. A method of separating protein from a photosynthetic organism comprising:
   disrupting cells of said photosynthetic organism to form a green juice;
   adding a crosslinking reagent to said green juice;
   lowering the pH of said green juice to a value in the range of 3.0 to 5.0 to cause said protein to precipitate and to form a coagulum; and
   separating said coagulum from said green juice.

2. A method as defined in claim 1 wherein said crosslinking reagent is a compound having the chemical formula:

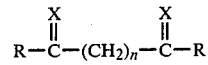

wherein X is a divalent ion; R is hydrogen or a short chain alkyl radical; and n is 0–10.

3. A method as defined in claim 2 wherein X is selected from the group consisting of O, S and NH.

4. A method as defined in claim 1 wherein said crosslinking reagent is a compound having the chemical formula:

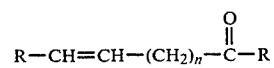

wherein R is hydrogen or a short chain alkyl radical; and n is 0-9.

5. A method as defined in claim 1 wherein said crosslinking reagent is glutaraldehyde.

6. A method as defined in claim 4 wherein said crosslinking reagent is crotenaldehyde.

7. A method as defined in claim 5 wherein $KHSO_4$ is added to lower the pH of said green juice to a value in the range of 3.0 to 5.0.

8. A method as defined in claim 1 wherein said crosslinking reagent is a bifunctional compound selected from the group consisting of glyoxal, glyceraldehyde, malonaldehyde, succinaldehyde, glutaraldehyde, ketobutylaldehyde, hexandeione, and dialdehyde starch.

9. A method as defined in claim 1 wherein said green coagulum is mechanically separated by centrifugation.

10. A method as defined in claim 1 wherein said photosynthetic organism is alfalfa leaves and wherein said crosslinking reagent comprises glutaraldehyde.

11. An internally cohesive protein coagulum having the characteristic of non-adherence to vessel and apparatus surfaces prepared according to the process defined in claim 1.

* * * * *